United States Patent [19]
Cho

[11] Patent Number: 5,704,057
[45] Date of Patent: Dec. 30, 1997

[54] REAL-TIME DATA SORTER

[75] Inventor: Kichul Cho, Mystic, Conn.

[73] Assignee: The United States of America as represented by the Secretary of the Navy, Washington, D.C.

[21] Appl. No.: 955,388

[22] Filed: Oct. 1, 1992

[51] Int. Cl.[6] ............................. G06F 12/02; G06F 7/24
[52] U.S. Cl. ..................... 395/481; 395/444; 395/607
[58] Field of Search .......................... 395/425, 800, 395/485, 600, 421.07, 421.1, 497.04, 444, 445, 481, 607; 364/DIG. 1

[56] References Cited

U.S. PATENT DOCUMENTS

| | | | |
|---|---|---|---|
| 4,100,532 | 7/1978 | Farnbach | 382/106 |
| 4,570,221 | 2/1986 | Martens | 395/485 |
| 5,051,944 | 9/1991 | Fetterolf et al. | 395/184.01 |
| 5,179,717 | 1/1993 | Sato et al. | 395/800 |
| 5,182,543 | 1/1993 | Siegel et al. | 340/531 |
| 5,276,873 | 1/1994 | Peters | 395/604 |

Primary Examiner—Eddie P. Chan
Assistant Examiner—Kevin L. Ellis
Attorney, Agent, or Firm—Michael J. McGowan; Michael F. Oglo; Prithvi C. Lall

[57] ABSTRACT

An apparatus is provided to sort an incoming stream of data points in terms of data point value and time of occurrence thereof. A first and second memory each have an input for receiving the incoming data stream and an output. Each data point accesses an address of the first memory based upon a corresponding data point value. The value of the accessed address is incremented by one by an incrementing means. The output of the incrementing means is coupled to the first memory to store the incremented value at the accessed address. Each data point value is also indicative of a predetermined offset address stored in the second memory. An address latch is coupled to the first and second memories to generate a concatenated address based on the value of the accessed address (i.e., before it is incremented) and the offset address. Each successive time of occurrence is stored in a storage means at the concatenated address.

9 Claims, 2 Drawing Sheets

REAL-TIME DATA SORTER

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention relates generally to data sorting, and more particularly to a real-time data sorter that sorts an incoming stream of data points in terms of data point value and time of occurrence thereof.

(2) Description of the Prior Art

Digital direction finding systems are frequently subjected to incoming pulsed signals from a variety of radio frequency sources and incidence angles. In such instances, it may be desirable to know how many signals (i.e., "occurrences") arrive from particular incidence angles. In the prior art, incoming signals, identified by angle-of-arrival (AOA), are stored chronologically in a memory with a corresponding time of occurrence (i.e. time-of-arrival or TOA). After some period of time, a computer collects and sorts the stored data in terms of AOA. The resulting data may then be displayed in the form of a histogram. Unfortunately, the time delay associated with the sorting operation may be unacceptable when real-time analysis is required.

SUMMARY OF THE INVENTION

Accordingly, it is an object of the present invention to provide an apparatus that matches a time of occurrence with corresponding data points of an incoming data stream and counts the number of occurrences for each data point value.

Another object of the present invention is to provide an apparatus that performs real-time data sorting for an incoming stream of angle-of-arrival data points in terms of data point value and time of occurrence.

Other objects and advantages of the present invention will become more obvious hereinafter in the specification and drawings.

In accordance with the present invention, an apparatus is provided to sort an incoming stream of data points by data point value and time of occurrence thereof. A first and second memory each have an input for receiving the incoming data stream and an output. Each data point accesses an address of the first memory based upon a corresponding data point value. The value of the accessed address is made available at the output of the first memory. Coupled to the output of the first memory is a means for incrementing the value of the accessed address by one. The output of the incrementing means is coupled to the first memory to store the incremented value at the accessed address. Each data point value is indicative of a predetermined offset address stored in the second memory which is made available at the output of the second memory. An address latch is coupled to the outputs of the first and second memories to generate a concatenated address based on the value of the accessed address (i.e., before it is incremented) and the offset address. Each successive time of occurrence is stored in a storage means at the concatenated address.

BRIEF DESCRIPTION OF THE DRAWING(S)

Other objects, features and advantages of the present invention will become apparent upon reference to the following description of the preferred embodiments and to the drawings, wherein:

FIG. 1 is a block diagram of the real-time data sorter according to the present invention; and FIG. 2 is a timing diagram used by the real-time data sorter according to the present invention.

DESCRIPTION OF THE PREFERRED EMBODIMENT(S)

Figure 1:
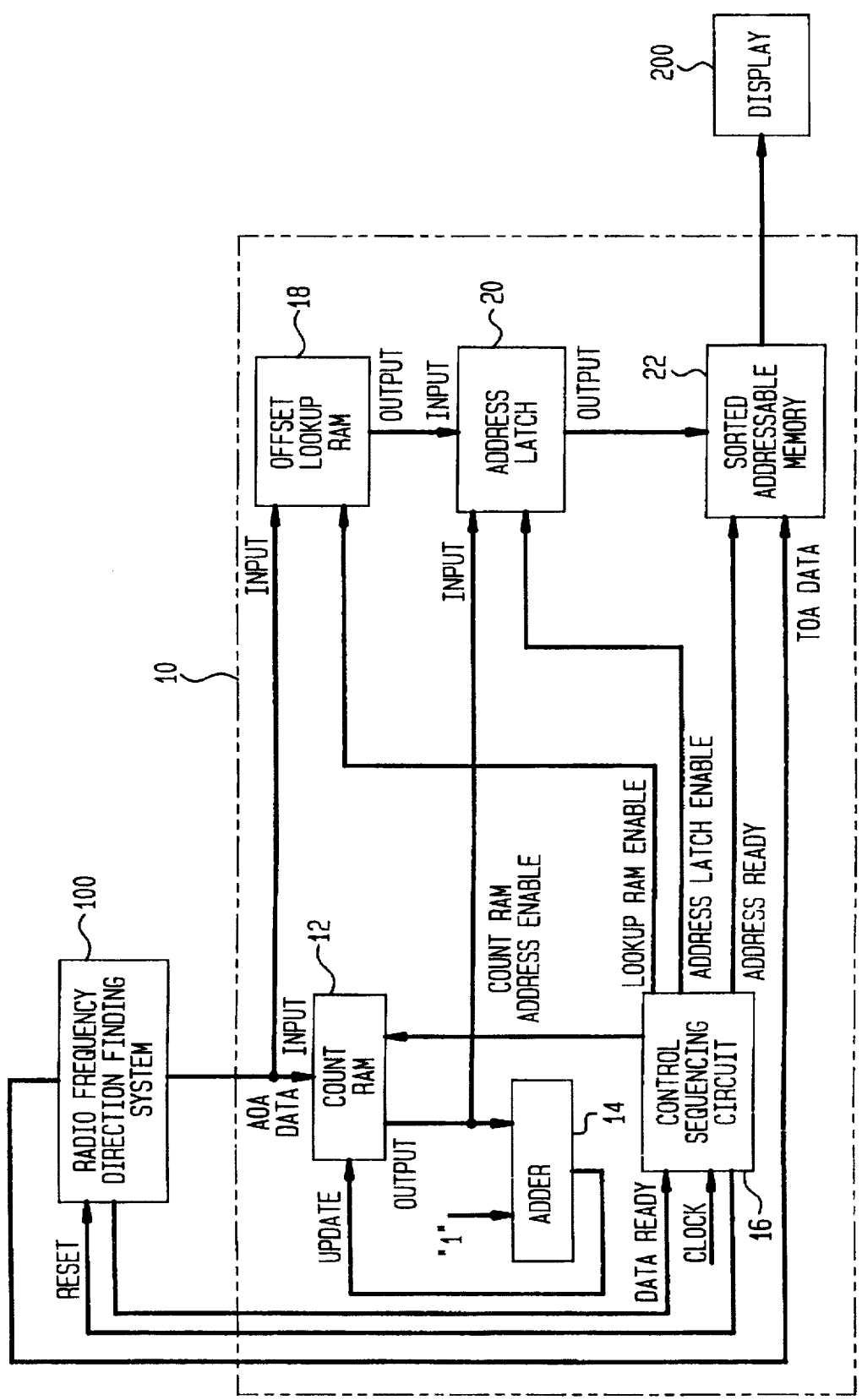

Referring now to the drawings, and more particularly to FIG. 1, the real-time data sorter 10 of the present invention is shown in block diagram form. By way of example, the present invention will be described for use with a radio frequency direction finding (RFDF) system 100. Accordingly, incoming data signals will be sorted based on angle-of-arrival (AOA) and time-of-arrival (TOA) for each AOA occurrence. However, as will be readily apparent to one skilled in the art, the present invention is not limited to such use.

Figure 2:
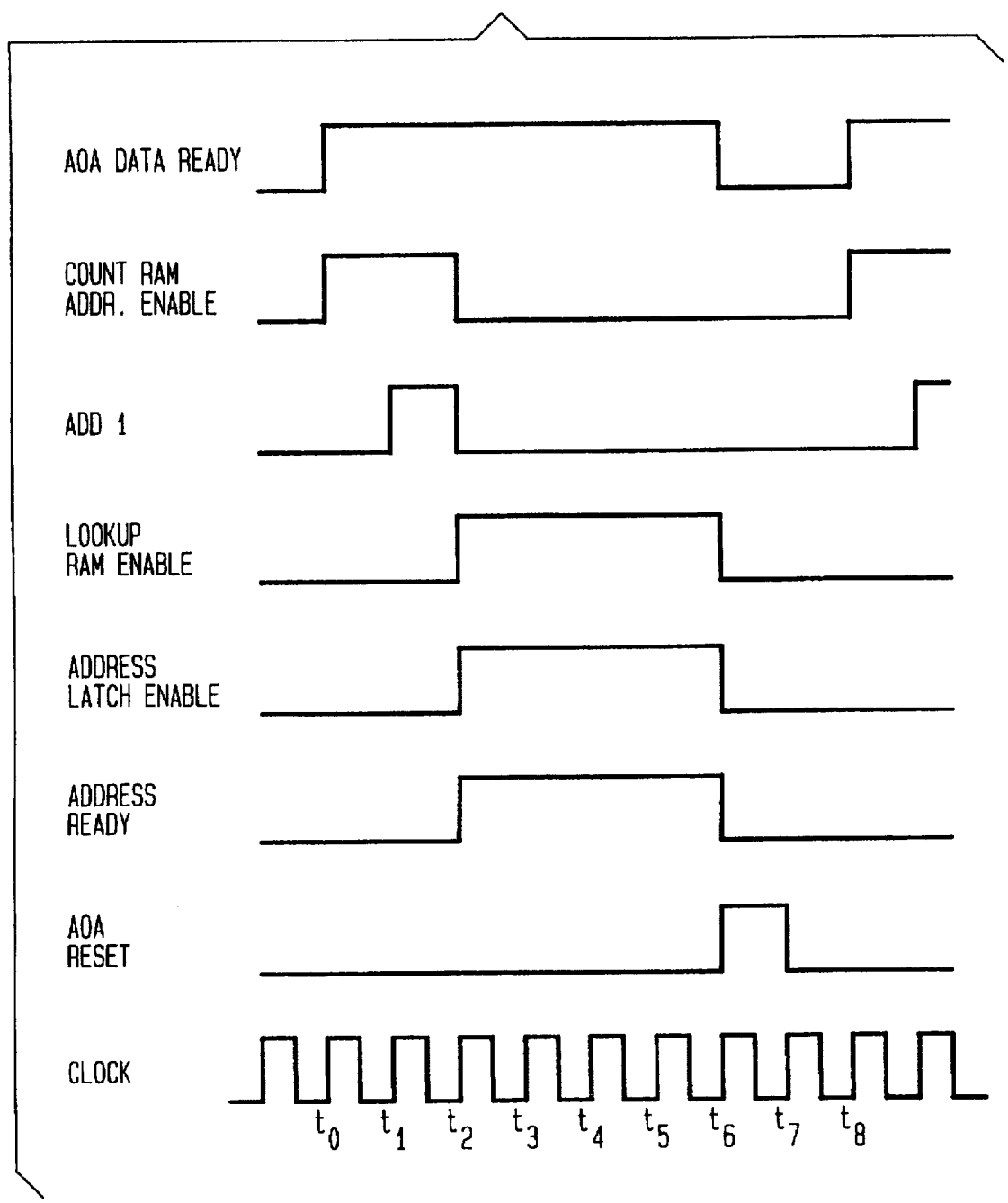

When the RFDF system 100 intercepts an incoming radar pulse, it will extract AOA data, produce an AOA data ready control signal and indicate a TOA for the AOA data. The number of bits allotted for TOA is predicated upon the RFDF system sampling rate and the time interval of interest. By way of example, the TOA in the preferred embodiment is 24 bit binary data. The value of each AOA data is indicative of a particular AOA. For example, if the AOA data is 8 bit binary data, there are 256 possible AOA values, i.e. AOA directions. The number of values is thus a design choice determined by system capability and desired resolution. The AOA data is supplied as an input to a count random access memory (RAM) 12. The value of the AOA data serves as an address location in count RAM 12. Accordingly, for the example of 8 bit AOA data, count RAM 12 must be a 256×8 RAM. The AOA data ready control signal serves as a timing signal issued to a control sequence circuit 16. Control sequence circuit 16 generates the necessary timing signals for sorter 10 based on a clock signal as will be explained with simultaneous reference to FIG. 2. In the preferred embodiment, control sequence circuit 16 is a shift register integrated circuit configured to generate timing pulses (as is well known in the art) in response to the AOA data ready control signal.

At time $t_o$, RFDF system 100 sends an AOA data ready control signal to control sequence circuit 16. In response to the AOA data ready control signal, control sequencing circuit 16 outputs a count RAM address enable control signal whose duration is two clock pulses as noted in FIG. 2. The count RAM address enable control signal is supplied to count RAM 12 to enable the address location in count RAM 12 indicated by the value of the AOA data. The contents of the enabled address location are thus available at the output of count RAM 12 as an input to an adder 14.

At start-up, the contents of the enabled location is zero. Adder 14 adds the numeric value of "1" to the contents of the address location supplied thereto. Since the count RAM address enable control signal is high from $t_1$ to $t_2$, the same address location in count RAM 12 is still enabled. Thus, the incremented contents of that address location are used to update the same location in count RAM 12. The net result is that the contents of an address location that correspond to a particular AOA is incremented by one for each occurrence of that particular AOA.

During this same time frame, the AOA data is supplied, for example, to an offset lookup RAM 18 which is essentially a table of offset values. Offset lookup RAM 18 is enabled by way of a lookup RAM enable control signal (FIG. 2) from control sequencing circuit 16. The choice of offset values is determined by the value of the AOA data. Thus, for the example noted above, an 8 bit AOA data would require an offset lookup RAM 18 having 256 offset values— one for each particular AOA. For instance, an AOA data value of 1 might have the offset of 1000, an AOA data value of 2 might then have the offset of 2000, etc. The offset for each AOA data is available at the output of offset lookup RAM 18 at time $t_2$. An alternative to offset lookup RAM 18 would be to use a memory management program that generated the offset value for each AOA data based on a predetermined scheme such as the one described above. In either case, the offset value is available as an input to an address latch 20 at $t_2$. As will be explained further hereinbelow, the offset value is indicative of a starting address location of a segment of memory within a sorted addressable memory 22.

The content of the enabled location of count RAM 12 is also supplied as an input to address latch 20. An address latch enable control signal is provided to latch 20 from control sequencing circuit 16 beginning at $t_2$. Address latch 20 forms a concatenated value using the offset value from offset lookup RAM 18 and the contents of the enabled memory location from count RAM 12. Thus, at the first occurrence of a particular AOA data, the concatenated value would simply be equal to the offset value. At the second occurrence of the same AOA data, the concatenated value produced by latch 20 would be the offset value incremented by one. Thus, the (concatenated value) output of latch 20 indicates a particular AOA data via its offset value and how many times that particular AOA has occurred since the time that the data stream started. Accordingly, the output of latch 20 signifies an AOA and the number of occurrences of this AOA in the data stream.

The concatenated value from latch 20 serves as an address supplied to sorted addressable memory 22 which, in the preferred embodiment, is a RAM. The TOA data from RFDF system 100 serves as the data to be stored at that address when memory 22 receives the address ready control signal from control sequencing circuit 16. In this way, the address location of memory 22 and the information stored thereat indicate AOA data, the number of its occurrence in the data stream and TOA thereof. Further, since each AOA occurrence is incremented by one, associated TOA data is stored successively in the sorted addressable memory 22. For the preferred embodiment 24 bit TOA data, memory 22 is a Y×24 addressable memory where Y is the size of the memory (e.g., 256K, 512K, etc.). For the example noted above (i.e. 8 bit AOA data), this results in a sorted TOA data list for each of the possible 256 AOA values. As a possible modification to accommodate data list overflow, a new offset value may be assigned to that AOA indicative of another segment of memory 22. Alternatively, count RAM 12 may be configured to zero the address associated with that particular AOA when the data list is full so that the memory segment indicated by the offset value will cycle back to its beginning address.

Once the TOA data has been stored in its sorted location in memory 22, control sequencing circuit issues an AOA reset control signal at time $t_6$. This control signal ends the current cycle and indicates that RFDF system 100 may intercept the next radar pulse. The above described sequence is then repeated for the next AOA data once the next AOA data ready control signal is issued. After a desired period of time, the information stored in memory 22 may be displayed on display 200 in the form of a histogram.

The advantages of the present invention are numerous. AOA data is stored in a sorted fashion at the time it is received. This results in a faster sorting operation since dedicated hardware sorts the data in real-time using a unique addressing scheme that includes sorting information. Further, since information is stored in a memory in a sorted fashion, a general purpose computer is no longer needed to perform the sorting function. System resolution can be easily increased by expanding the size of the data fields and the memory needed to store same. In addition, a multiple sorting device could easily be configured so that data streams with more than two elements of relevance could be sorted simultaneously. For example, if the data included radio frequency (RF) values as well as AOA and TOA, then by simply employing two real-time data sorters as described above, two sorted lists of TOA could be simultaneously generated—a TOA list for each AOA value and a TOA list for each RF value.

Although the present invention has been described relative to the sorting of AOA and TOA data in an RFDF system, it is not so limited. For example, the present invention might be used in a situation where numerous remote locations are sending data packets simultaneously to a central location (e.g., police squad cars reporting to a command post). Complete transmissions would be broken into packets and interspersed with data packets from other remote locations. Using the real-time data sorter of the present invention, the incoming data packets could be attributed back to their respective locations in real-time. In this way, multiple voice transmissions may be received and recreated at the central location. The key advantage of the present invention is that hardware driven sorting can keep pace with real-time events such as multiple voice transmissions.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An apparatus for real-time data sorting of an incoming stream of data points, each data point defining a data point value and being associated with a time of arrival, comprising:

first memory means having an input for receiving the data point values within the incoming stream of data points and an output, each data point value being indicative of an address of said first memory means wherein a count value is stored in said first memory means at the address of said first memory means, said count value being made available at the output of said first memory means;

an adder having an input coupled to the output of said first memory means for incrementing said count value by one, and said adder having an output coupled to said first memory means wherein said count value incremented by one is stored at said address of said first memory means;

second memory means having an input for receiving the data point values within the incoming stream of data points and an output, each data point value being indicative of an address of said second memory means, wherein a unique offset value is stored in said second memory means at each said address of said second memory means, said unique offset value being made available at the output of said second memory means;

address latch means having an input coupled to the outputs of said first memory means and said second memory means for generating a concatenated address value based on said count value and said unique offset value, said address latch means further having an output; and storage means coupled to the output of said address latch means for storing time of arrival of each data point value at an address equivalent to said concatenated address value means for generating timing control signals issued to said first memory means, said second memory means, said address latch means and said storage means.

2. An apparatus as in claim 1 wherein said first memory means and said second memory means comprise random access memory.

3. An apparatus as in claim 1 wherein said storage means comprises random access memory.

4. An apparatus as in claim 1 wherein said means for generating timing control signals comprises shift register integrated circuit means.

5. An apparatus for real-time data sorting of an incoming stream of data points, each data point defining a data point value and being associated with a time of arrival comprising:

memory means having an input for receiving the data point values within the incoming stream of data points and an output, each data point value being indicative of an address of said memory means wherein a count value is stored in said memory means at the address of said memory means, said count value being made available at the output of said memory means;

means having an input coupled to the output of said memory means for incrementing said count value by one, and having an output coupled to said memory means wherein said count value incremented by one is stored at said address of said memory means;

means, having an input for receiving the data point values within the incoming stream and an output, for generating an offset value for each such data point value;

address latch means coupled to receive said count value and said offset value to generate a concatenated value therefrom; and storage means coupled to said address latch means for storing time of arrival at an address equivalent to said concatenated value means for generating timing control signals issued to said memory means, said means for generating an offset address, said address latch means and said storage means.

6. An apparatus as in claim 5 wherein said memory means comprises a random access memory.

7. An apparatus as in claim 5 wherein said storage means comprises random access memory.

8. An apparatus as in claim 5 wherein said means for generating timing control signals comprises shift register integrated circuit means.

9. An apparatus comprising:

a radio frequency direction finding (RFDF) system for detecting radio frequency sources in terms of an associated angle-of-arrival (AOA) designated from one of X possible AOA directions where X is a binary factorial having at least 8 bits, said RFDF system producing an AOA data ready control signal and time-of-arrival (TOA) data for each AOA;

a first random access memory (RAM) having an input for receiving each AOA and an output, each AOA being indicative of an address of said first RAM at which a count value is stored and made available at the output of said first RAM;

an adder having an input coupled to the output of said first RAM for incrementing said count value by one, said adder having an output coupled to said first RAM wherein said count value incremented by one is stored at the address of said first RAM;

a second RAM having an input for receiving each AOA and an output, each AOA being indicative of an address of said second RAM at which a unique offset value is stored and made available at the output of said second RAM;

address latch means having an input coupled to the outputs of said first RAM and said second RAM for generating a concatenated address value based on said count value and said unique offset value, said address latch means further having an output;

a shift register control circuit having an input coupled to said RFDF system for receiving said AOA data ready control signal and for generating timing control pulses in response thereto for distribution to each of said first RAM, said second RAM and said address latch means; and a Y×Z RAM coupled to the output of said address latch means for storing TOA data associated with each AOA at an address equivalent to said concatenated address value, wherein Z is a finite binary bit resolution of the TOA data and Y is the size of said Y×Z RAM.

* * * * *